US009086161B2

(12) United States Patent
Onodera et al.

(10) Patent No.: US 9,086,161 B2
(45) Date of Patent: Jul. 21, 2015

(54) VALVE APPARATUS WITH POSITIVE AND NEGATIVE PRESSURE RELIEF VALVES

(75) Inventors: Hirofumi Onodera, Kariya (JP); Yuichiro Miura, Obu (JP)

(73) Assignee: DENSO CORPORATION, Kariya (JP)

( * ) Notice: Subject to any disclaimer, the term of this patent is extended or adjusted under 35 U.S.C. 154(b) by 421 days.

(21) Appl. No.: 13/539,633

(22) Filed: Jul. 2, 2012

(65) Prior Publication Data

US 2013/0008537 A1    Jan. 10, 2013

(30) Foreign Application Priority Data

Jul. 6, 2011  (JP) .................................. 2011-149928

(51) Int. Cl.
  *F16K 17/18*  (2006.01)
  *F16K 24/02*  (2006.01)
  *F16K 27/02*  (2006.01)
  *F16K 31/06*  (2006.01)

(52) U.S. Cl.
  CPC .................. *F16K 17/18* (2013.01); *F16K 24/02* (2013.01); *F16K 27/029* (2013.01); *F16K 31/0655* (2013.01)

(58) Field of Classification Search
  CPC ... F16K 31/0655; F16K 27/029; F16K 24/02; F16K 17/18
  USPC .............. 137/493, 493.8, 512, 528, 535, 538, 137/540, 543.19, 543.23, 599.11, 601.14, 137/601.2
  See application file for complete search history.

(56) References Cited

U.S. PATENT DOCUMENTS 3,457,949 A * 7/1969 Coulter ..................... 137/543.21
5,065,790 A * 11/1991 Kornas ........................ 137/514.5
5,839,468 A * 11/1998 Allred ........................ 137/454.4
6,536,467 B2 * 3/2003 Wu et al. ................... 137/543.19
6,543,478 B2 * 4/2003 Kline ............................. 137/606
6,581,632 B2 * 6/2003 Walpole et al. ............. 137/512.1
6,978,801 B2 * 12/2005 Takahashi ................. 137/543.19
7,296,594 B1 * 11/2007 Phanco .................... 137/599.18
8,276,613 B2 * 10/2012 Park et al. ...................... 137/535
2005/0217734 A1 10/2005 Takakura
2010/0269921 A1 10/2010 Pifer et al.

FOREIGN PATENT DOCUMENTS

JP         04-135867    12/1992
JP         5-14757       2/1993
JP         5-47649       6/1993

OTHER PUBLICATIONS

Office Action (2 pages) dated Jul. 2, 2013, issued in corresponding Japanese Application No. 2011-149928 and English translation (2 pages).

* cited by examiner

*Primary Examiner* — William McCalister
(74) *Attorney, Agent, or Firm* — Nixon & Vanderhye P.C.

(57) ABSTRACT

A valve apparatus includes a valve housing, an electric valve, a positive pressure relief valve and a negative pressure relief valve. The valve housing defines therein a valve inside space divided by a partition plate into two spaces communicating with the first port portion and the second port portion respectively. The partition plate has an electric valve opening, a positive pressure relief opening and a negative pressure relief opening separately from each other. When the positive pressure relief valve opens the positive pressure relief opening, a fluid flows only from the first port portion to the second port portion. When the negative pressure relief valve opens the negative pressure relief opening, the fluid flows only from the second port portion to the first port portion.

5 Claims, 3 Drawing Sheets

VALVE APPARATUS WITH POSITIVE AND NEGATIVE PRESSURE RELIEF VALVES

CROSS REFERENCE TO RELATED APPLICATION

This application is based on and incorporates herein by reference Japanese Patent Application No. 2011-149928 filed on Jul. 6, 2011.

TECHNICAL FIELD

The present disclosure relates to a valve apparatus including an electric valve, a positive pressure relief valve and a negative pressure relief valve.

BACKGROUND

Conventionally, a valve apparatus described in Patent Document 1 (JP 05-047649 U) is known as a tank-closing valve of a fuel vapor leak prevention device for a vehicle. The valve apparatus has a single valve, which is used as an electric valve and as a positive pressure relief valve. Valve bodies of both the electric valve and the positive pressure relief valve are made in common so as to configure the single valve.

In order to keep a pressure in a fuel tank within a predetermined allowable pressure range for protection of the fuel tank, a negative pressure relief valve is required to be provided in addition to the positive pressure relief valve. However, in Patent Document 1, it is difficult to integrate both the positive pressure relief valve and the negative pressure relief valve with the electric valve.

In Patent Document 2 (USP 2010/0269921 A1), a valve apparatus includes an integrated structure, in which an electric valve and a positive pressure relief valve are integrated, and a negative pressure relief valve. However, similarly to Patent Document 1, only one of the positive pressure relief valve and the negative pressure relief valve is integrated with the electric valve. Thus, in the valve apparatus, a flow passage of the negative pressure relief valve is separated from a flow passage of the integrated structure of the electric valve and the positive pressure relief, valve.

In Patent Document 2, although the electric valve, the positive pressure relief valve and the negative pressure relief valve are provided in the valve apparatus, a configuration of the flow passages in a valve housing may be complicated, and a pressure loss may be increased.

SUMMARY

According to an aspect of the present disclosure, a valve apparatus includes a valve housing, a partition plate, an electric valve, a positive pressure relief valve and a negative pressure relief valve. The valve housing defines therein a valve inside space communicating with first and second port portions. The partition plate divides the valve inside space into a space communicating with the first port portion and a space communicating with the second port portion. The partition plate has an electric valve opening, a positive pressure relief opening and a negative pressure relief opening, which respectively penetrate through the partition plate. The electric valve is configured to open or close the electric valve opening so as to connect or disconnect the first and second port portions. The positive pressure relief valve is configured to open or close the positive pressure relief opening so as to connect or disconnect the first and second port portions. The negative pressure relief valve is configured to open or close the negative pressure relief opening so as to connect or disconnect the first and second port portions. The positive pressure relief valve opens the positive pressure relief opening to let a fluid flow only from the first port portion to the second port portion through the positive pressure relief opening when a pressure in the first port portion is higher than a pressure in the second port portion by a predetermined value. The negative pressure relief valve opens the negative pressure relief opening to let the fluid flow only from the second port portion to the first port portion through the negative pressure relief opening when the pressure in the first port portion is lower than the pressure in the second port portion by a predetermined value.

Therefore, the electric valve, the positive pressure relief valve and the negative pressure relief valve are provided in the single valve apparatus. The valve inside space is provided in the valve housing, and the valve inside space is divided by the partition plate. Additionally, the partition plate has the electric valve opening opened or closed by the electric valve, the positive pressure relief opening opened or closed by the positive pressure relief valve, and the negative pressure relief opening opened or closed by the negative pressure relief valve. Accordingly, the structure of the valve apparatus can be made simple.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Embodiments of the present disclosure will be described hereinafter referring to drawings. In a following exemplar embodiment, a specific example of the present disclosure will be described, but the present disclosure is not limited to the exemplar embodiment.

Figure 1:
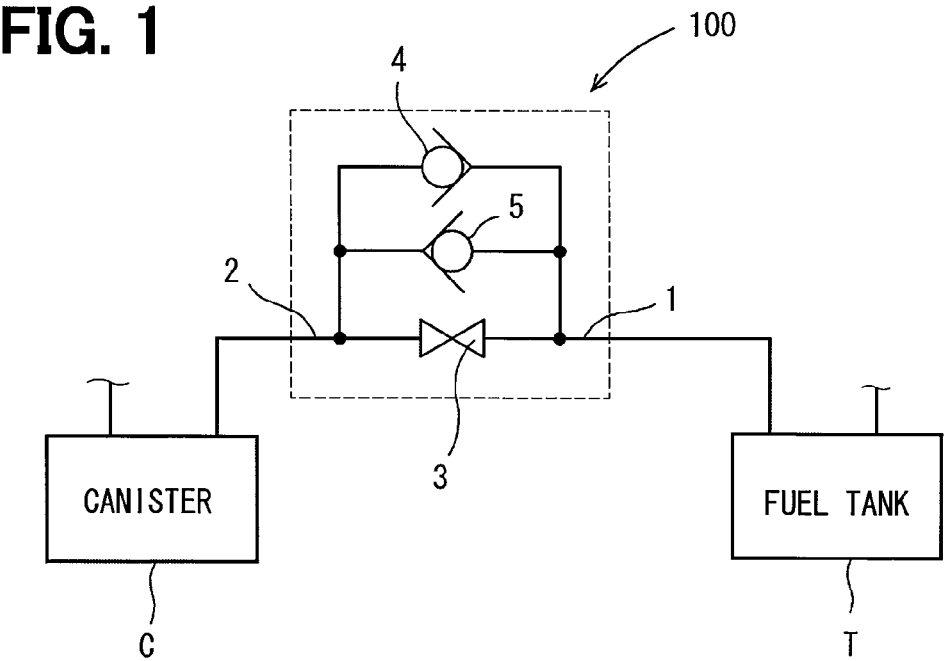
FIG. 1 is a schematic diagram showing a valve apparatus including an electric valve, a positive pressure relief valve and a negative pressure relief valve, according to an exemplar embodiment of the present disclosure.

As shown in FIG. 1, a valve apparatus 100 of an exemplar embodiment is provided in a pipe, through which a fuel tank T and a canister C communicate with each other, and the valve apparatus 100 is used as a tank closing valve which closes the fuel tank T. The fuel tank T is configured to accumulate liquid fuel such as gasoline therein, and the canister C is configured to accumulate fuel vapor through adsorption of the fuel vapor. The valve apparatus 100 includes a first port portion 1 attached to a pipe communicating with an upper space inside the fuel tank T, and a second port portion 2 attached to a pipe communicating with an inner space of the canister C. Each of the ports 1 and 2 has an approximately pipe shape.

The valve apparatus 100 includes an electric valve 3, a positive pressure relief valve 4 and a negative pressure relief valve 5. The electric valve 3 connects or disconnects the first port portion 1 and the second port portion 2 by opening or closing of the electric valve 3. The positive pressure relief valve 4 is open to let a fluid flow only from the first port portion 1 to second port portion 2 when a pressure in the first port portion 1 is higher by a predetermined value than a pressure in the second port portion 2. The negative pressure relief valve 5 is open to let the fluid flow only from the second port portion 2 to the first port portion 1 when the pressure in the first port portion 1 is lower by a predetermined value than the pressure in the second port portion 2.

Figure 2:
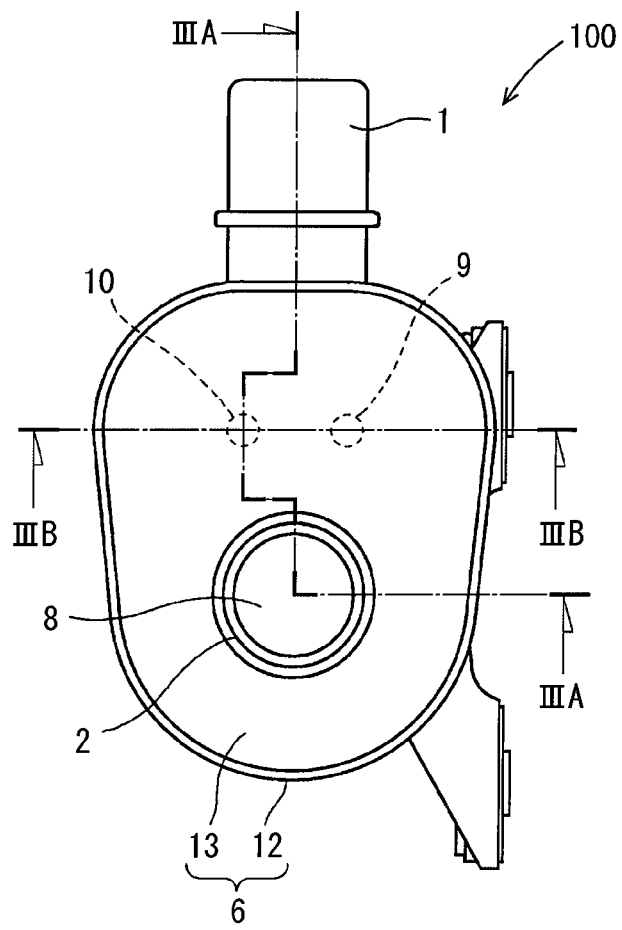
FIG. 2 is a side view showing the valve apparatus according to the exemplar embodiment.
Figure 3A:
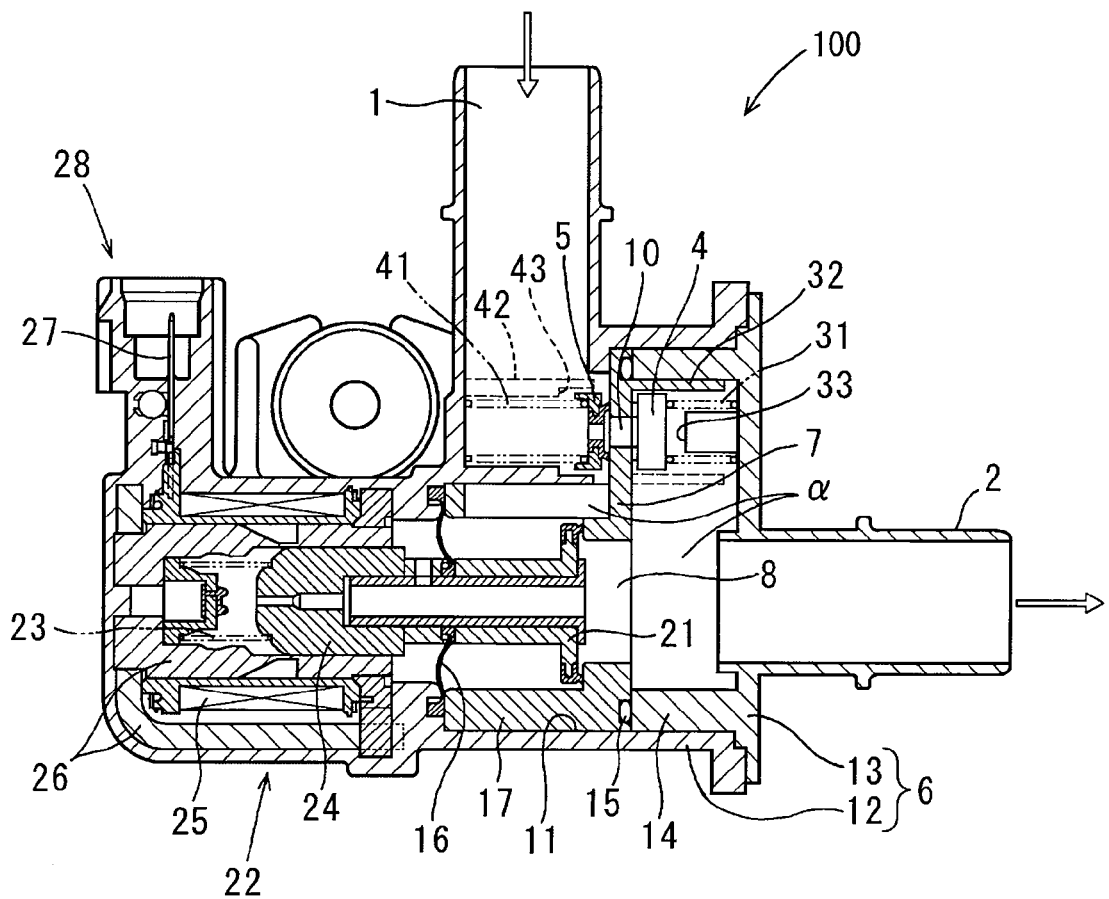
FIG. 3A is a sectional view taken from a line IIIA-IIIA in FIG. 2.
Figure 3B:
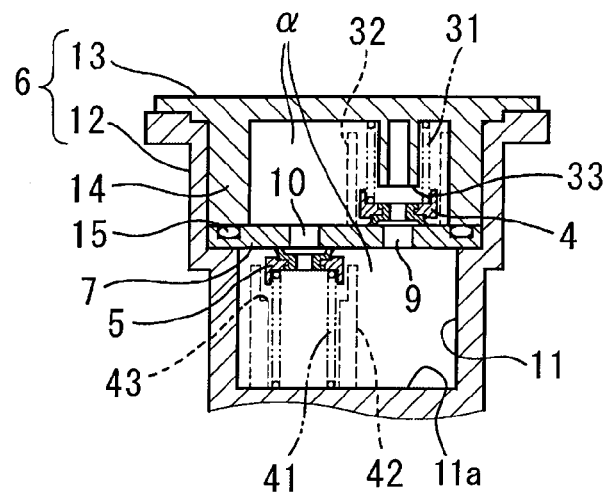
FIG. 3B is a sectional view taken from a line IIIB-IIIB in FIG. 2.

As shown in FIGS. 2 to 3B, the valve apparatus 100 further includes a valve housing 6. The valve housing 6 includes a casing 12 having a recess portion 11, and a cover 13 joined to the casing 12 to close an opening part of the recess portion 11. The recess portion 11 defines a valve inside space a inside the valve housing 6, and the valve inside space a communicates with insides of both the first and second port portions 1 and 2.

The casing 12 and the cover 13 are made of resin, for example, but materials of the casing 12 and the cover 13 are not limited. In the exemplar embodiment, the first port portion 1 is connected to the casing 12, and the second port portion 2 is connected to the cover 13. However, conversely, the first port portion 1 may be connected to the cover 13, and the second port portion 2 may be connected to the casing 12. Alternatively, both the first and second port portions 1 and 2 may be connected to the casing 12.

The valve apparatus 100 further includes a partition plate 7 which divides the valve inside space α defined inside the valve housing 6 into a space communicating with the inside of the first port portion 1 and a space communicating with the inside of the second port portion 2. A material of the partition plate 7 is not limited, but the partition plate 7 is made of resin in the exemplar embodiment, for example. The partition plate 7 is disposed inside the recess portion 11 of the casing 12, and the cover 13 is joined to the casing 12, so that the partition plate 7 is interposed and fixed between the cover 13 and the casing 12.

The cover 13 has a pressing cylinder 14 which presses a rim of the partition plate 7 throughout an entire circumference of the partition plate 7. A sealing ring 15 (O-ring) is provided between the partition plate 7 and the pressing cylinder 14 to seal therebetween throughout the entire circumference. The cover 13 is fixed to the casing 12 by using joining technology such as welding or adhesion, and a sealing performance is ensured by the joint part between the cover 13 and casing 12. The partition plate 7 of the exemplar embodiment has a diaphragm holding part 17 which presses annually a circumferential rim of a diaphragm 16 attached to a valve body 21 of the electric valve 3, but the diaphragm holding part 17 is not limited to the above structure.

The partition plate 7, which divides the valve inside space α, has an electric valve opening 8 opened or closed by the electric valve 3, a positive pressure relief opening 9 opened or closed by the positive pressure relief valve 4, and a negative pressure relief opening 10 by the negative pressure relief valve 5. The electric valve opening 8, the positive pressure relief opening 9 and the negative pressure relief opening 10 are provided at different positions in the partition plate 7 separately. As shown in FIGS. 3A and 3B, these openings 8, 9, penetrate through the partition plate 7 in a thickness direction of the partition plate 7, respectively.

Specific examples of the electric valve 3, the positive pressure relief valve 4 and the negative pressure relief valve 5 will be described below.

(Electric Valve 3)

In the electric valve 3, the valve body 21 is actuated by an electromagnetic actuator 22 to open or close the electric valve opening 8 based on an electrical operational command. Accordingly, the electric valve 3 can be opened or closed arbitrary. An example of a configuration of the electromagnetic actuator 22 will be described.

The electromagnetic actuator 22 includes a movable core 24, a return spring 23, a coil 25, a magnetic stator 26 (e.g., a stator core inside the coil 25 and a yoke outside the coil 25) and a connector portion 28. The movable core 24 is provided in conjunction with the valve body 21 to be actuated together with the valve, body 21, and the return spring 23 is provided at a side of the movable core 24 opposite from the valve body 21 to urge the movable core 24 and the valve body 21 toward the partition plate 7. The coil 25 generates a magnetic force by energization thereof, and the magnetic stator 26 which is used as magnetic paths inside and outside the coil 25. The connector portion 28 has a terminal 27 as an energizing path to the coil 25. The electromagnetic actuator 22 opens the electric valve opening 8 by actuating the movable core 24 in conjunction with the valve body 21 and by separating the valve body 21 from the partition plate 7 against an urging force of the return spring 23. The terminal 27 is electrically connected via a wire to an engine control unit (ECU) which controls a fuel vapor leak prevention device. Thus, the electric valve 3 is controlled by the ECU depending on an operational state of an engine, thereby being adjusted in its open-close state or in its open degree through a control of an electrical current or the like.

In the exemplar embodiment, as shown in FIG. 3A, the return spring 23 is arranged inside the electromagnetic actuator 22 to urge the valve body 21 via the movable core 24. However, the return spring 23 may directly urge the valve body 21. Moreover, in the exemplar embodiment, an annular sealing ring (rubber packing) is provided as a sealing member in an area, where the valve body 21 contacts the partition plate 7, to seal between the valve body 21 and the partition plate 7 when the electric valve opening 8 is closed. A sealing performance in a closed state of the electric valve opening 8 is improved because of the sealing member, but the sealing member is not limited to the above structure.

(Positive Pressure Relief Valve 4)

In the exemplar embodiment, a first poppet valve (canister-side poppet valve) having an approximately circular plate shape is arranged at one side of the partition plate 7 near to the second port portion 2 in the thickness direction of the partition plate 7 to open or close the positive pressure relief opening 9 in the valve inside space α. The first poppet valve is used as the positive pressure relief valve 4 in the exemplar embodiment, and the positive pressure relief valve 4 is urged toward the partition plate 7 by an urging force of a first coil spring 31 (canister-side coil spring) having an end fixed to the cover 13. The first coil spring 31 is provided at a side of the positive pressure relief valve 4 opposite to the partition plate 7 to urge the positive pressure relief valve 4 toward the partition plate 7. Thus, the positive pressure relief valve 4 opens the positive pressure relief opening 9 to let fuel vapor flow only from the fuel tank T to the canister C, when a pressure in the fuel tank T is higher than a pressure (positive pressure) predetermined based on, for example, the urging force of the first coil spring 31. Accordingly, the pressure in the fuel tank T is prevented from exceeding an allowable pressure range.

Figure 4A:
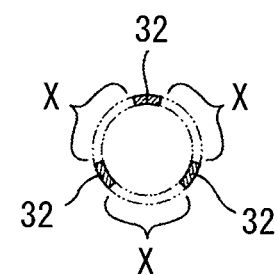
FIG. 4A is a schematic cross-sectional view showing a first valve guide for the valve apparatus according to the exemplar embodiment.

The positive pressure relief valve 4 (first poppet valve) is supported by a first valve guide 32 (canister-side valve guide) disposed on the one side of the partition plate 7 near to the second port portion 2 in the thickness direction of the partition plate 7 so that the positive pressure relief valve 4 is movable only in its open-close direction, i.e., in an up-down direction in FIG. 3B. The first valve guide 32 of the exemplar embodiment has openings X through which fluid is capable of passing, as shown in FIG. 4A. For example, the first valve guide 32 of the exemplar embodiment is configured by multiple (e.g., three) poles having arc-like shapes in cross-section and extending from the partition plate 7 to the cover 13, as shown in FIG. 4A. That is, the poles and the openings X are alternately provided in a circumferential direction of the first valve guide 32. These poles of the first valve guide 32 may be provided by disposing a cylindrical hollow member on the partition plate 7 and by removing a part of the cylindrical hollow member.

In the exemplar embodiment, a first stopper 33 (canister-side stopper) is disposed on an inner side of the cover 13 in the valve inside space a to restrict a largest open degree of the positive pressure relief valve 4. The first stopper 33 may be formed into a cylindrical hollow shape or a cylindrical solid shape. The first stopper 33 has a smaller diameter than a diameter of the positive pressure relief valve 4, and extends from the inner side of the cover 13 toward the partition plate 7. When an open degree of the positive pressure relief valve 4 reaches a predetermined degree, the positive pressure relief valve 4 contacts an end of the first stopper 33 so that the largest open degree of the positive pressure relief valve 4 is restricted.

Moreover, the first stopper 33 is arranged radially inward of the first coil spring 31 to support and guide the first coil spring 31. In the exemplar embodiment, an annular sealing ring (rubber packing) is provided as a sealing member in an area, where the positive pressure relief valve 4 contacts the partition plate 7, to seal between the positive pressure relief valve 4 and the partition plate 7 when the positive pressure relief opening 9 is closed. A sealing performance in a closed state of the positive pressure relief opening 9 is improved because of the sealing member, but the sealing member is not limited to the above structure.

(Negative Pressure Relief Valve 5)

In the exemplar embodiment, a second poppet valve (tank-side poppet valve) having an approximately circular plate shape is arranged at the other side of the partition plate 7 near to the first port portion 1 in the thickness direction of the partition plate 7 to open or close the negative pressure relief opening 10 in the valve inside space α. The second poppet valve is used as the negative pressure relief valve 5, and the negative pressure relief valve 5 is urged toward the partition plate 7 by an urging force of a second coil spring 41 (tank-side coil spring) having an end fixed to a bottom wall 11a of the recess portion 11 of the casing 12. The second coil spring 41 is provided at a side of the negative pressure relief valve 5 opposite from the partition plate 7 to urge the negative pressure relief valve 5 toward the partition plate 7. Thus, the negative pressure relief valve 5 opens the negative pressure relief opening 10 to introduce air into the fuel tank T from the canister C, when the pressure in the fuel tank T is lower than a pressure (negative pressure) predetermined based on, for example, the urging force of the second coil spring 41. Accordingly, the pressure in the fuel tank T is prevented from decreasing lower than the allowable pressure range.

Figure 4B:
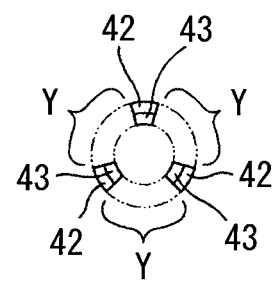
FIG. 4B is a schematic cross-sectional view showing a second valve guide for the valve apparatus according to the exemplar embodiment.

The negative pressure relief valve 5 (second poppet valve) is supported by a second valve guide 42 (tank-side valve guide) disposed on the bottom wall 11a of the recess portion 11 of the casing 12 so that the negative pressure relief valve 5 is movable only in its open-close direction, i.e., in an up-down direction in FIG. 3B. Similarly to the first valve guide 32, the second valve guide 42 of the exemplar embodiment has openings Y through which fluid is capable of passing, as shown in FIG. 4B. For example, the second valve guide 42 of the exemplar embodiment is configured by multiple (e.g. three) poles having arc-like shapes in cross-section and extending from the bottom wall 11a of the recess portion 11 to the cover 13, as shown in FIG. 4B. That is, the poles and the openings Y are alternately provided in a circumferential direction of the second valve guide 42. These poles of the second valve guide 42 may be provided by disposing a cylindrical hollow member on the bottom wall 11a of the recess portion 11 and by removing a part of the cylindrical hollow member.

In the exemplar embodiment, a step is provided radially inward of the second valve guide 42, and the step is used as a second stopper 43 (tank-side stopper) which restricts a largest open degree of the negative pressure relief valve 5. Specifically, an inner diameter of a part of the second valve guide 42 at a side of the partition plate 7 with reference to a position of the step is larger than a diameter of the negative pressure relief valve 5, and an inner diameter of a part of the second valve guide 42 at a side of the bottom wall 11a of the recess portion 11 with reference to the position of the step is smaller than the diameter of the negative pressure relief valve 5. That is, the inner diameter of the part of the second valve guide 42 connected to the bottom wall 11a of the recess portion 11 is relatively small. When an open degree of the negative pressure relief valve 5 reaches a predetermined degree, the negative pressure relief valve 5 contacts a step end of the second stopper 43 so that the largest open degree of the negative pressure relief valve 5 is restricted.

Moreover, the part of the second valve guide 42, near to the bottom wall 11a of the recess portion 11 with reference to the position of the step, functions to support and guide the second coil spring 41. In the exemplar embodiment, an annular sealing ring (rubber packing) is provided as a sealing member in an area, where the negative pressure relief valve 5 contacts the partition plate 7, so as to seal between the negative pressure relief valve 5 and the partition plate 7 when the negative pressure relief opening 10 is closed. A sealing performance in a closed state of the negative pressure relief opening 10 is improved because of the sealing member, but the sealing member is not limited to the above structure.

Effects of the positive and negative pressure relievable valve apparatus 100 of the exemplar embodiment will be described.

In the valve apparatus 100 of the exemplar embodiment, as described above, the electric valve opening 8 for the electric valve 3, the positive pressure relief opening 9 for the positive pressure relief valve 4, and the negative pressure relief opening 10 for the negative pressure relief valve 5 are provided separately from each other in the partition plate 7 which divides the valve inside space α. Thus, the valve inside space α is used as a common flow passage for the electric valve 3, the positive pressure relief valve 4 and the negative pressure relief valve 5. Therefore, a flow passage is not required to be provided in the valve housing 6 in addition to the common flow passage (valve inside space α), and a configuration of a flow passage in the valve housing 6 can be simplified. Because the valve inside space α is used commonly as flow passages of these three valves 3, 4, 5, a pressure loss in the valve apparatus 100 can be reduced.

The valve apparatus 100 of the exemplar embodiment is obtained by assembling the second coil spring 41, the negative pressure relief valve 5 (second poppet valve), the partition plate 7, the positive pressure relief valve 4 (first poppet valve), the first coil spring 31 and the cover 13, in this order from a side of the opening part of the recess portion 11 of the casing 12. Therefore, in the above-described configuration of the valve apparatus 100, an assembly of the valve apparatus 100 can be made to be easy, and the valve apparatus 100 can be manufactured in a low cost.

In the exemplar embodiment, the largest open degree of the negative pressure relief valve 5 is restricted by the second stopper 43, and the largest open degree of the positive pressure relief valve 4 is restricted by the first stopper 33. Accordingly, largest inclination angles of the positive pressure relief valve 4 and the negative pressure relief valve 5 can be limited, respectively. Consequently, a malfunction, in which the positive pressure relief valve 4 or the negative pressure relief valve 5 is inclined and jams in the second guide 42 or in the first guide 32, can be prevented.

In the exemplar embodiment, the openings X are provided in the first guide 32, and the openings Y are provided in the second guide 42, to let fluid flow smoothly through the guides 42 and 32, respectively. Accordingly, a passage resistance in the valve inside space αcan be reduced, and the pressure loss in the valve apparatus 100 can be further reduced.

Although the present disclosure has been fully described in connection with the exemplar embodiment thereof with reference to the accompanying drawings, it is to be noted that various changes and modifications will become apparent to those skilled in the art as described below.

For example, in the above-described embodiment, the present disclosure is applied to the tank closing valve provided between the fuel tank T and the canister C. However, the present disclosure may be applied to a canister-atmosphere release valve provided in a pipe connecting the canister C to the atmosphere.

In the above-described embodiment, the electromagnetic valve is used as an example of the electric valve 3, but the electric valve 3 is not limited to the electromagnetic valve. Alternatively, an electric valve, which can be controlled by an electrical energization control, may be used as the electric valve 3. For example, a vacuum switching valve (VSV) utilizing a negative pressure, a motor valve utilizing an electric motor, or a piezo valve utilizing a piezo actuator may be used as the electric valve 3.

In the above-described embodiment, the poppet valve (first poppet valve) is used as an example of the positive pressure relief valve 4, but the positive pressure relief valve 4 is not limited to this. For example, a one-way valve, such as a reed valve having a blade spring made of metal or resin, may be used as the positive pressure relief valve 4.

In the above-described embodiment, the poppet valve (second poppet valve) is used as an example of the negative pressure relief valve 5, but the negative pressure relief valve 5 is not limited to this. For example, a one-way valve, such as a reed valve having a blade spring made of metal or resin, may be used as the negative pressure relief valve 5.

In the above-described embodiment, the first poppet valve is used as the positive pressure relief valve 4, and the second poppet valve is used as the negative pressure relief valve 5. However, the first poppet valve may be used as the negative pressure relief valve 5, and the second poppet valve may be used as the positive pressure relief valve 4.

Additional advantages and modifications will readily occur to those skilled in the art. The disclosure in its broader terms is therefore not limited to the specific details, representative apparatus, and illustrative examples shown and described.

What is claimed is:

1. A valve apparatus comprising:
a valve housing which defines therein a valve inside space communicating with first and second port portions;
a partition plate which divides the valve inside space into a space communicating with the first port portion and a space communicating with the second port portion, the partition plate having an electric valve opening, a positive pressure relief opening and a negative pressure relief opening, which respectively penetrate through the partition plate;
an electric valve configured to open or close the electric valve opening so as to connect or disconnect the first and second port portions;
a positive pressure relief valve configured to open or close the positive pressure relief opening so as to connect or disconnect the first and second port portions; and
a negative pressure relief valve configured to open or close the negative pressure relief opening so as to connect or disconnect the first and second port portions, wherein
the positive pressure relief valve opens the positive pressure relief opening to let a fluid flow only from the first port portion to the second port portion through the positive pressure relief opening when a pressure in the first port portion is higher than a pressure in the second port portion by a predetermined value,
the negative pressure relief valve opens the negative pressure relief opening to let the fluid flow only from the second port portion to the first port portion through the negative pressure relief opening when the pressure in the first port portion is lower than the pressure in the second port portion by a predetermined value,
the valve housing includes a casing which has a recess portion defining the valve inside space, and a cover which closes an opening part of the recess portion,
the partition plate is provided inside the recess portion,
the positive pressure relief valve is a first poppet valve urged toward the partition plate by an urging force of a first coil spring having an end fixed to a wall of the cover, the wall of the cover being separated by a predetermined distance from the partition plate,
the partition plate has a first valve guide extending toward the cover and supporting the first poppet valve so that the first poppet valve is movable in its open-close direction,
the negative pressure relief valve is a second poppet valve urged toward the partition plate by an urging force of a second coil spring having an end fixed to a bottom wall of the recess portion, the bottom wall of the recess portion being separated by a predetermined distance from the partition plate, and
the casing has a second valve guide extending from the bottom wall of the recess portion toward the partition plate and supporting the second poppet valve so that the second poppet valve is movable in its open-close direction.

2. The valve apparatus according to claim 1, further comprising:
a first stopper provided in the cover to restrict a largest open degree of the first poppet valve supported by the first valve guide; and
a second stopper provided in the second valve guide to restrict a largest open degree of the second poppet valve supported by the second valve guide.

3. The valve apparatus according to claim 1, wherein
the first valve guide has an opening through which the fluid is capable of passing, and
the second valve guide has an opening through which the fluid is capable of passing.

4. The valve apparatus according to claim 1, wherein the partition plate includes a thickness defined by a first surface and a second surface and the first poppet valve is closed when contacting the first surface and the second poppet valve is closed when contacting the second surface.

5. The valve apparatus according to claim 4, wherein the positive pressure relief opening and the negative pressure relief opening are both through the first surface and the second surface.

\* \* \* \* \*